(No Model.)
H. HOLLERITH.
METHOD OF AND APPARATUS FOR OPERATING PRESSURE OR VACUUM BRAKES.
No. 363,463. Patented May 24, 1887.
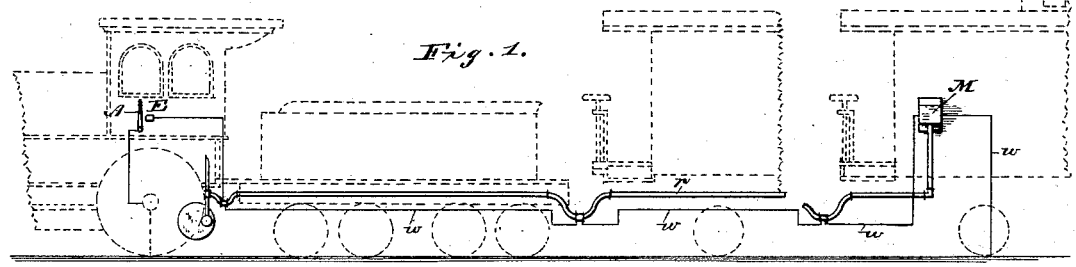
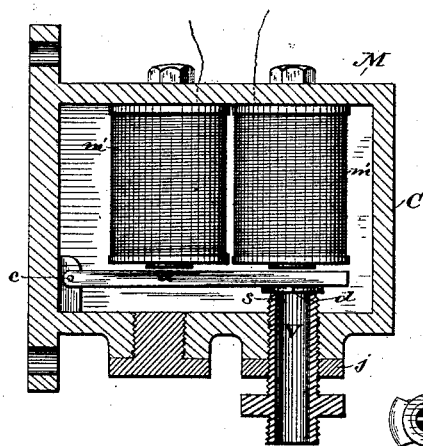
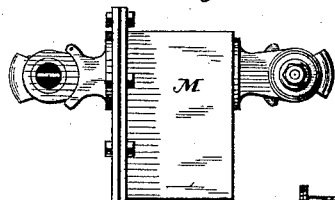
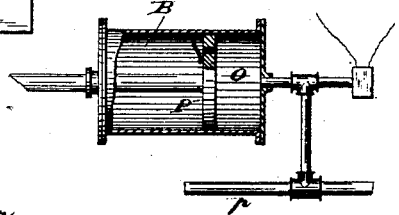
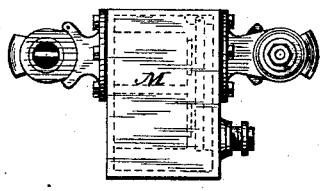
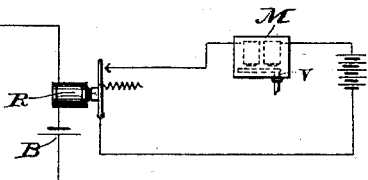
Witnesses. Inventor.

UNITED STATES PATENT OFFICE.

HERMAN HOLLERITH, OF ST. LOUIS, MISSOURI.

METHOD OF AND APPARATUS FOR OPERATING PRESSURE OR VACUUM BRAKES.

SPECIFICATION forming part of Letters Patent No. 363,463, dated May 24, 1887.

Application filed November 1, 1886. Serial No. 217,708. (No model.)

*To all whom it may concern:*

Be it known that I, HERMAN HOLLERITH, of St. Louis, Missouri, have invented certain new and useful Improvements in the Method of and Apparatus for Operating Pressure or Vacuum Brakes; and I do hereby declare the following to be a full, clear, and exact description of the same, reference being had to the accompanying drawings, forming a part of this specification, and to the figures and letters of reference marked thereon.

My present invention relates more particularly to that class of continuous train-brakes for railroad-cars known as "automatic air or vacuum brakes," which are applied by opening communication between the train-pipe and external air—as is done, for example, with the Eames, Westinghouse, or Carpenter automatic brakes. Ordinary stops with such brakes are made by the manipulation of a valve by the engineer on the engine, thereby opening communication between the train-pipe and external air. The time required to apply the brakes is thus dependent upon the time required to change the pressure in train-pipe sufficiently, which with long trains becomes a very serious delay. Furthermore, the brakes are applied first on forward portion of train, thus causing a severe and often dangerous shock to cars of rear end of trains as slack is taken up.

My invention has for its object to provide a method of and apparatus for expediting the application of such brakes, and so avoid or reduce the shock above referred to. To accomplish this object, I arrange certain devices to operate simultaneously with engineer's valve on engine, one or more valves controlling communication between train-pipe and external air and located at different points of train, one valve being located, preferably, at rear end of train.

In the drawings, Figure 1 is a view of several cars, showing the manner of carrying out my improved method; Fig. 2, a valve located in the main air-passage in the train; Fig. 3, a side view of a form of valve for use between cars; Fig. 4, a top view of the same, showing in dotted lines the internal arrangements thereof; Fig. 5, a view of a modified form of valve-box to be used similarly; Fig. 6, a view showing the application of the invention to the Carpenter air-brake; Fig. 7, a view of a brake system employing a closed circuit; Fig. 8, a view of a detail of the same.

In Fig. 1 I have shown one form of apparatus for carrying my invention into operation applied to any ordinary air or vacuum brake. On the engine at E, I arrange any suitable switch-mechanism, such that when the lever or handle A operating the engineer's brake-valve is in the position for applying the brakes it closes an electric circuit extending through the train, and through an electro-magnet, M, at rear of train. This electro-magnet M operates a valve, V, which controls communication between the train-pipe and external air. When therefore the engineer's lever or handle is brought to a position to apply brakes by opening communication between the train-pipe and external air, it closes the electric circuit through the train and electro-magnet, M, thus operating the valve V simultaneously with the engineer's valve. The rapidity with which the brakes are applied is thus greatly increased. Furthermore, the brakes being applied at the rear end of train simultaneously with brakes at front of train, the shock usually caused by taking up the slack is prevented. To release or hold the brakes at rest, the engineer's handle is brought to its proper position, when the electric circuit is broken, the valve V closed, and brakes operated in ordinary manner.

If desired, as before stated, several valves may be placed at different points in train, thus still further increasing the rapidity of application of brakes. Again, if desired, the switch mechanism can be so arranged as not to operate at an intermediate position of engineer's lever, corresponding to applying the brakes easily and gradually, as would be done when it is desired merely to check the speed of train, but only to operate when lever is brought to position corresponding to brakes "full on," as is done in making quick or emergency stops.

The details of this apparatus can, as is obvious, be varied indefinitely in their construction or electrical arrangement. Thus, for example, instead of making one an open circuit, the apparatus can readily be arranged to operate in a closed circuit. One way of effecting this result will hereinafter be more fully described. The circuit through the train can be arranged in any desirable manner. I prefer to secure an insulated wire (see Fig. 1) along the bottom of each car, electrically connected at each end with the metallic coupling attached to rubber air-hose. With this arrangement, when coupling up the air-hose of a train in the ordinary manner, a complete circuit is made through the train, the return being effected through the ground or rails. If desired, the circuit can be made through the air-pipe by insulating it from rail, and connecting it with hose-couplings by piece of wire inside of rubber air-hose.

The construction and arrangement of electro-magnetic valve which I prefer are shown in Fig. 2. It consists of a cast-iron box or casing, C, to which are bolted the two magnet-cores $m'$ $m'$, forming the electro-magnet for operating the valve. The armature of this electro-magnet $a$ is pivoted to the casing at $c'$, and is provided with a disk, $d$, of suitable material, forming a valve seating against the cylindrical or tubular seat $s$. This seat I prefer to secure, as shown, by screw-thread in casing and jam-nut $j$, which construction allows of ready adjustment of valve-seat with reference to armature of magnet and consequent area of discharge of valve when armature is attracted, as is done when brakes are applied. When this valve-box is used in connection with an automatic vacuum-brake, in which case air is admitted to train-pipe when brakes are applied, I connect the tubular valve-seat in any suitable manner with the train-pipe. The interior of valve-box being open to external air when used in connection with automatic compressed air-brakes, (Westinghouse or Carpenter,) which are applied by reducing the pressure in train-pipe, I connect the interior of valve-box with the train-pipe, the tubular valve-seat being open to external air.

As before stated, with long trains it may be desirable to locate such valve-boxes at some intermediate points. This can be effected in any desirable manner. I prefer to arrange a valve-box, such as before described, with a half-coupling at each side, as shown in Figs. 3, 4, and 5, such coupling being electrically insulated from the valve-box casing, but connected with terminals of electro-magnet. This valve-box is suspended between two cars by coupling with air-hose each side. When using the compressed air-brakes, communication to rear of train is effected through the interior of the valve-box, while electric circuit is made through electro-magnet. It will readily be seen that when brakes are applied this valve operates simultaneously with the others. It will also be readily understood that only one coupling need be insulated from box, or else, if desired, the valve-box can be made in two segments insulated from each other, somewhat as shown in Fig. 5.

If desirable, of course an electro-magnetic valve may be applied to each car. In some brakes, for example, arranged substantially as shown in Fig. 6, (as in Carpenter's brake,) the brakes are held off by pressure, being maintained on both sides of a piston, P. The brakes are applied by reducing or exhausting the pressure in train-pipe $p$ and volume O, when air in chamber B expands, acting on piston P, and thus applies the brakes in usual manner. It will be noticed that though such construction is very simple and offers an entirely automatic brake, still as the entire volume O must be exhausted before brakes are fully applied, they are comparatively slow in application. The application of such brakes can be very materially expedited by attaching an electric valve, V, such as hereinbefore described, to each cylinder. When engineer's handle or lever is brought to position to apply brakes, the valve V on each car opens, thereby securing a very quick and uniform application of the brakes. The brakes are released or otherwise operated in ordinary manner.

If desired, a closed circuit can be used throughout the train, operating an ordinary relay, which controls a local circuit through valve electro-magnet. Such an arrangement is shown in Fig. 7.

E represents engineer's lever or handle, to which is attached switch mechanism, such that circuit is always closed, except for position "brakes on," in which position the circuit is broken, thereby releasing the armature of relay R, which closes the local circuit through battery B and valve-magnet M, thus operating the valve V. In case of a train breaking in two, with this arrangement the valve at rear end of train (in case of freight-trains located, preferably, in caboose-car) would be automatically operated, securing application of brakes promptly at rear end of train, and thereby preventing the rear section running into the forward section, as is very apt to occur with the ordinary brakes.

When closed circuit is used, a switch must be attached to each car, so that relay can be short-circuited to prevent the brakes being set when train is uncoupled. I prefer to arrange a simple switch mechanism to the stop-cock at the end of each car, as shown in Fig. 8. A metallic button, $g$, is connected with the wire $w$. The handle $h$ of stop-cock $k$, located in train-pipe $p$, is provided with metallic springs $i$, so that when handle $h$ is turned to close air-pipes the circuit is closed through $w$, $g$, and $i$, thereby preventing the brakes being set when hose is uncoupled.

It will of course be understood that various forms of devices can be employed for carrying out my improved method of operating brakes, and I do not therefore desire to be understood as confining myself to the particular forms shown herein, although I have shown those preferred for simplicity and certainty of action.

I claim as my invention—

1. In a system of pressure or vacuum brakes, the combination, with the main in which the pressure or vacuum is maintained and a main valve for opening communication between said main and the external air, of a valve operated by an electro-magnet for opening communication between said main and the external air, and an electrical circuit, including said magnet and switching devices included in said circuit and connected to the main valve, operating when the valve is turned to connect the main with the external air to change the circuit and operate the electro-magnetic valve, substantially as described.

2. In a system of pressure or vacuum brakes for railway-trains, the combination, with the main in which the pressure or vacuum is maintained and a main valve located on the locomotive and operating to connect the main with the external air to apply the brakes, of a valve operating to connect the main with the external air, located on the rear car of the train and controlled by an electro-magnet, and an electrical circuit including said electro-magnet and a switching device connected to the main valve on the locomotive, and operating when the main valve is opened to connect the main with the external air to operate said circuit and change the condition of the magnet and open the valve, substantially as described.

3. In a system of pressure or vacuum brakes for railway-trains, the combination, with the main in which pressure or a vacuum is maintained, of the main valve located on the locomotive for connecting the same with the external air, the couplings at the end of the cars, the valve-boxes containing the electro-magnetic valves, having the couplings on their sides adapted to couple with those in the cars, the electrical circuit extending through the train and including the magnets of each of the valves, and switching devices connected to the main valve and included in the circuit, operating when the main valve is opened to change the circuit and cause all the valves to be opened, substantially as described.

4. In a system of pressure or vacuum brakes for railway trains, the combination, with the main in which pressure or a vacuum is maintained, of the main valve located on the locomotive for connecting the main with the external air, one or more electro-magnetic valves adapted, when open, to connect the main with the external air, an electrical circuit including the electro-magnets of the valves and a battery, and an electro-magnetic switch normally keeping the circuit open, a closed circuit extending through the train and including the coils of the switch-magnet and a battery, and a switch included in said circuit and connected to the main valve, whereby when the main circuit is broken the local circuit connected with the valve will be closed, the valve operated, and the brakes applied, substantially as described.

5. In a system of pressure or vacuum brakes for railway-trains, the combination, with the main in which the pressure or vacuum is maintained, of the main valve located on the locomotive for connecting the main with the external air, the couplings at the ends of the cars, valves at each end of the car adapted to be closed when the cars are disconnected, one or more electro-magnetic valves adapted, when open, to connect the main with the external air, an electrical circuit including the electro-magnets of the valves and a battery and the contacts of an electro-magnetic switch normally keeping the circuit open, a closed circuit extending through the train and including the coils of the switch-magnet and a battery, a switch included in said circuit and connected to the main valve, and switches connected to the cocks at the ends of the cars adapted, when the cocks are closed, to short-circuit the main closed circuit, substantially as described.

HERMAN HOLLERITH.

Witnesses:
A. S. STEWART,
THOMAS DURANT.